Figure 1:
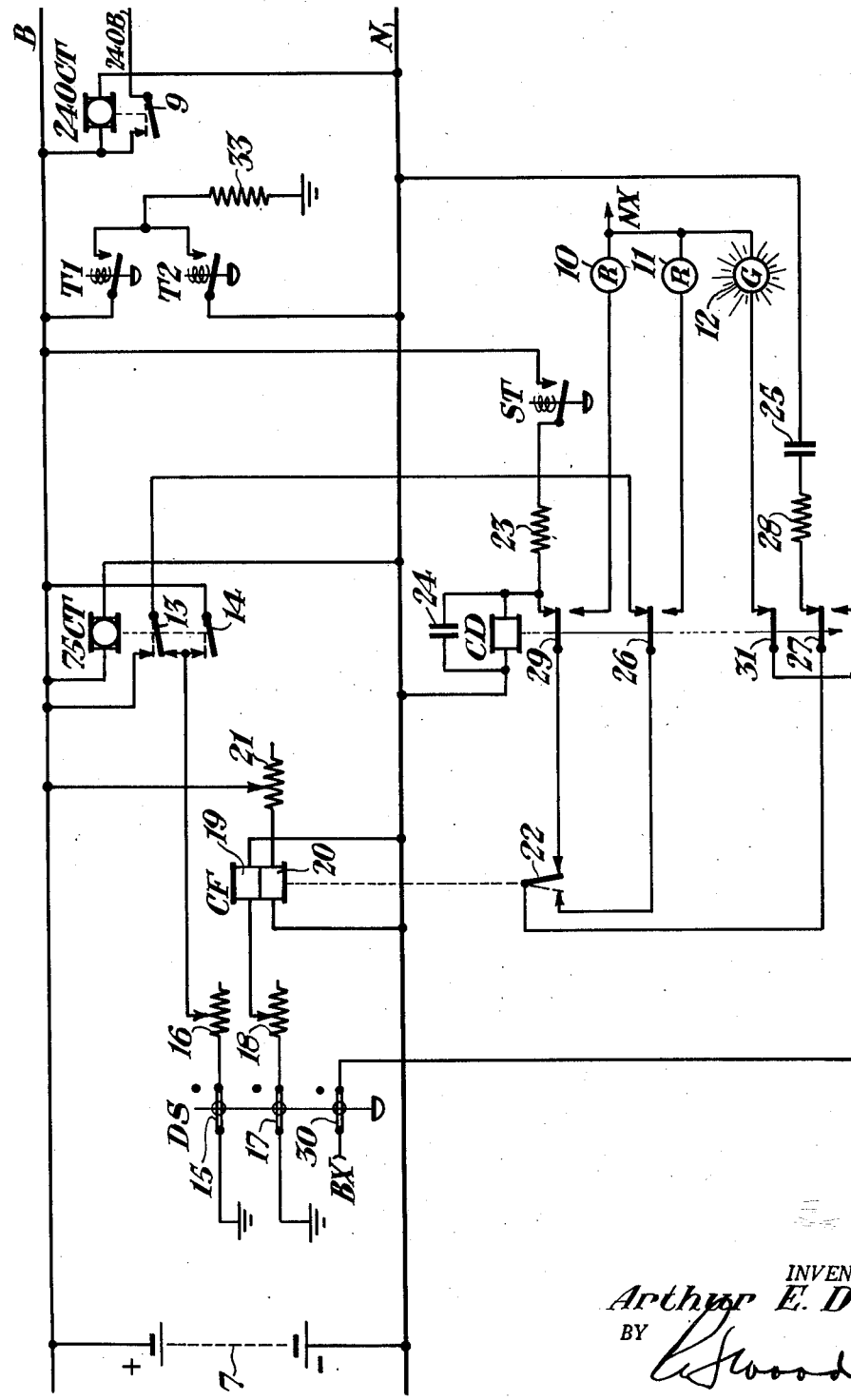

INVENTOR.
Arthur E. Dodd.
BY
HIS ATTORNEY

INVENTOR.
Arthur E. Dodd.
BY
HIS ATTORNEY

Patented Dec. 16, 1952

2,622,139

UNITED STATES PATENT OFFICE 2,622,139

GROUND DETECTING APPARATUS

Arthur E. Dodd, Edgewood, Pa., assignor to Westinghouse Air Brake Company, a corporation of Pennsylvania Application May 31, 1950, Serial No. 165,135

13 Claims. (Cl. 177—311)

My invention relates to ground detecting apparatus, and more particularly to apparatus for detection of grounded conditions in a system which employs both steady and coded direct current.

In signaling systems using direct current, grounded conditions may exist in the circuits at times, particularly where such circuits are carried in underground cables. Should grounds occur in any control circuits for relays, the relays may pick up or release depending upon their connections and function to initiate circuit operations for which such relays were provided. Particularly when such relays control the operation of safety devices such as railway signals or track switches in a railway signaling system, it is desirable that a grounded condition be removed as soon after occurrence as possible. While apparatus has been provided in the past for the detection of grounded line conditions, independent indications of normal operating conditions, and indications of grounded conditions of the individual line wires were not provided.

The present invention is an improvement over that shown and claimed in an application for Letters Patent of the United States, Serial No. 119,399, filed on October 4, 1949, by George W. Baughman. The arrangement shown in the above-referred-to application is intended for use with systems supplying only steady direct current for the operation of the apparatus employed in the system. However, in many systems, it is necessary to supply pulses of direct current energy to apparatus such as, for example, ratchet-operated timing relays. Such energy is obtained by supplying energy to a "coded energy wire" from the steady direct current wire, over a contact of a continuously operating coding device. In the above-referred-to Baughman application, one winding of a sensitive polarized code-following relay is connected between one of the power wires and ground and is arranged and constructed so that the energy which flows through the winding operates the contacts of the relay to one of their two positions. A recurrently operated coding device operating at some particular rate, say, for example, 75 times per minute, recurrently connects the other power wire to ground, and causes the sensitive relay to operate its contacts to their other position. As long as no steady grounds exist, the contacts of the sensitive relay operate between their two positions, and a code detecting relay is picked up in response to the recurrent operation of the sensitive relay. If a steady ground on either of the two power wires occurs, the sensitive relay retains its contacts in one or the other of its two positions, and the code detecting relay is accordingly released to indicate the presence of a ground. However, this arrangement is intended for use only with power systems supplying steady energy. If used with a system having a coded energy wire, the presence of a ground on the coded energy wire may cause the sensitive relay to be operated by the recurrent interruptions of the power supplied to the coded energy wire, so that under some conditions a ground on the coded energy wire would not be detected.

Accordingly, it is an object of my invention to provide ground detecting apparatus of the type described, in which the presence of a recurrent ground may be detected.

Another object of my invention is to provide ground detecting apparatus of the type described employing an improved method of detecting the recurrent operation of the sensitive relay.

A further object of my invention is to provide an improved ground detecting apparatus of the type described in which recurrent and concurrent operation of the sensitive relay and its controlling coding device are required to indicate that the system is free from grounds.

Still another object of my invention is to provide an improved ground detecting apparatus of the type described in which the recurrent and concurrent operation of the sensitive relay and its controlling coding device are detected by a condenser discharge type of code detecting apparatus.

Another object of my invention is to provide an improved power detecting apparatus of the type described in which the recurrent and concurrent operation of the sensitive relay and its controlling coding devices are detected by a code detecting apparatus employing mechanical rectification of electrical energy.

Other objects of my invention and features of novelty thereof will become apparent from the following description taken in connection with the accompanying drawings.

In practicing my invention, I provide a sensitive code-following relay and a controlling coding device, arranged as described in the previously-referred-to Baughman application, so that the operation of the coding device causes the recurrent operation of the contacts of the sensitive relay so long as the power wires supplying energy to the apparatus are free from grounds. The power wires additionally supply energy over the contacts of another coding device to a coded energy wire. A condenser is supplied with charging energy when the contacts of the controlling coding device and the contacts of the sensitive relay are both in one of their two positions, and the energy stored in the condenser is supplied to the winding of a slow release code detecting relay when the contacts of the sensitive relay are in the other of their two positions. Thus, the contacts of the controlling coding device and the contacts of the sensitive relay must be recurrently operated in synchronism in order for the code detecting relay to be picked up, to thereby indicate the non-existence of grounds. Should a ground develop on either of the power wires, the sensitive relay will not operate, or if a ground develops on the coded energy wire, the sensitive relay will not be operated in synchronism with the controlling coding device, and as a result, the code detecting relay will be released to indicate the presence of a ground.

In a modification of the arrangement described above, I provide a code detecting arrangement employing a transformer, one winding of which is supplied with impulses of direct current by a circuit including a contact of the sensitive relay, and the other winding of which supplies energy to the winding of a slow release relay through a contact of the controlling coding device. When the contacts of the sensitive relay and the controlling device are operating recurrently and in synchronism, the energy induced in the transformer winding is rectified mechanically and retains the code detecting relay in its picked-up position. When the contacts of the sensitive relay and the controlling coding device stop operating, or do not operate in synchronism, the supply of rectified energy to the code detecting relay is reduced or cut off entirely, and the code detecting relay releases to indicate the presence of a ground.

I shall describe two forms of ground detecting apparatus embodying my invention and shall then point out the novel features thereof in claims.

Figure 2:
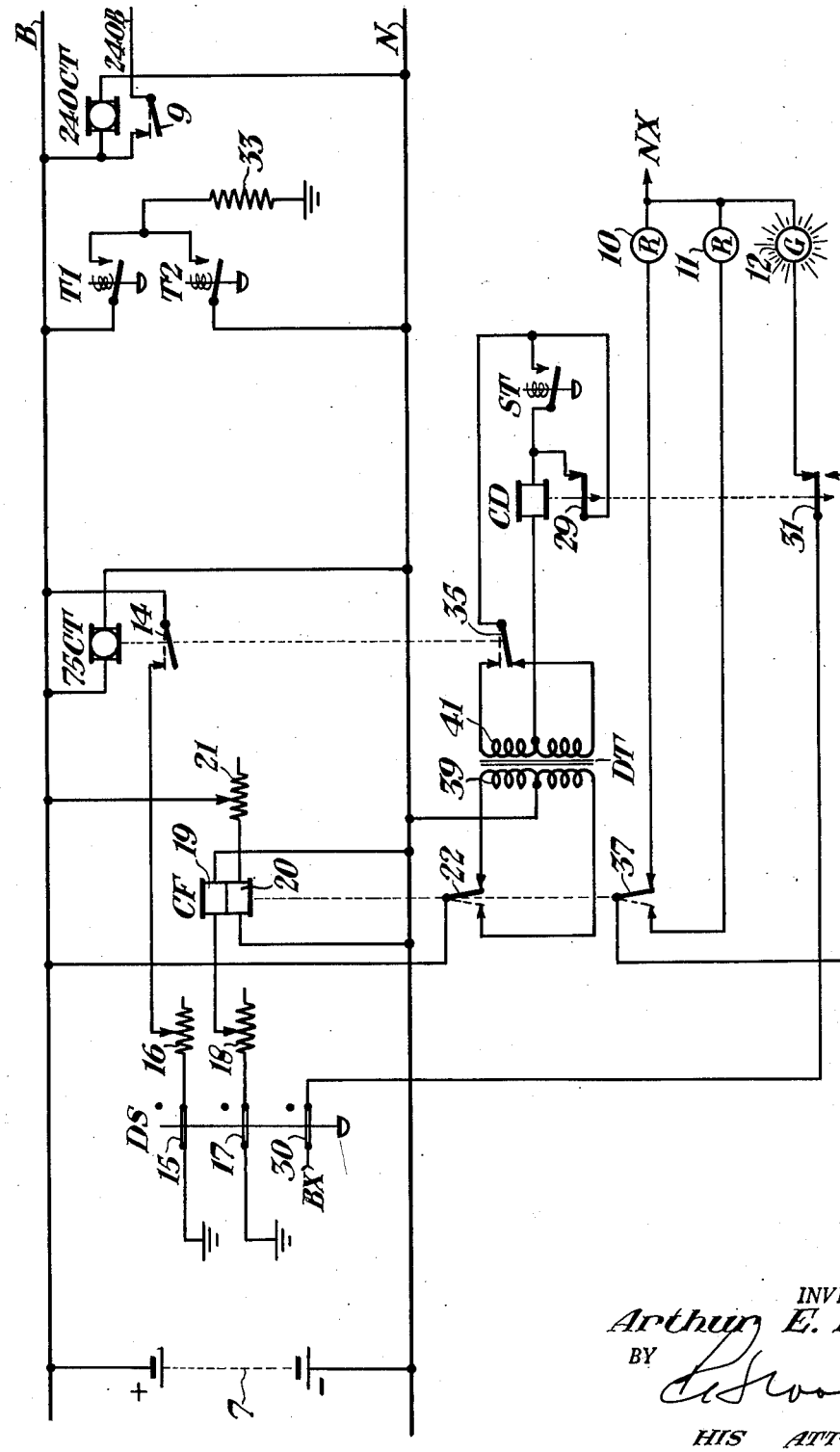

In the drawings, Fig. 1 is a diagrammatic view showing one form of ground detecting apparatus embodying my invention and utilizing a condenser discharge type of code detecting apparatus, and Fig. 2 is a diagrammatic view showing a modification of the arrangement shown in Fig. 1, and arranged to employ the transformer type of code detecting apparatus.

Similar reference characters refer to similar parts in each of the two views.

Referring to Fig. 1, there is shown a ground detector system arranged to detect the grounding of either one of two power wires, B and N, connected directly to the terminals of a direct current source 7, or of a third power wire 240B, connected to wire B through a contact 9 of a continuously operating code transmitter 240CT of conventional type. These three wires may be considered as forming a portion of the power supply circuits for a signaling system, the 240B wire supplying impulses of energy coded at a given rate, say, for example, 240 impulses per minute for the operation of timing relays, or the like. As shown, the ground detector system is arranged to indicate the occurrence of a connection of wire B, wire 240B, or wire N to ground as a result of a fault which has a resistance less than a predetermined value and to indicate whether wire B, 240B, or wire N is grounded due to such fault. When wire B is grounded as a result of a fault, a red lamp 11 is lighted steadily; when wire N is grounded, a red lamp 10 is lighted steadily; and when wire 240B is grounded, lamps 10 and 11 will be flashed in an irregular manner, that is, the lamps will not be illuminated for equal time intervals. Normally, a green lamp 12 is lighted, which indicates that the ground detector system is in operation and that the wires B, N, and 240B are substantially free from grounds.

For the detection of grounds this ground detector system employs coded current of the type well known in the railway signaling art, supplied by a continuously operating controlling coding device, or code transmitter 75CT, of a conventional type. The winding of the code transmitter 75CT is supplied with energy over connections to wires B and N leading to the terminals of the source 7, and its contacts 13 and 14 operate continuously at a fixed rate such as 75 times per minute. Contact 14 periodically establishes a high resistance connection from ground through the normally closed contact 15 of a disconnect switch DS and an adjustable resistor 16 to one of the line wires, wire B as shown. This connection is included in the circuit for the main or control winding 19 of a sensitive code following polar relay CF, which circuit extends from a second connection to ground over contact 17 of switch DS through an adjustable resistor 18 and winding 19 to the other line wire N. The values of the resistors 16 and 18 are sufficiently high so that in the event of a fault, currents of only negligible value are supplied to the signaling apparatus through the ground detector, and in the absence of a fault the line wires B and N are for all practical purposes essentially ungrounded.

The polar relay CF is electrically biased by the provision of a second winding 20 which is constantly supplied with energy from wires B and N, in series with an adjustable resistor 21.

The windings of relay CF and the values of the resistors in their circuits are so proportioned that when the circuit for winding 19 is open, the energization of winding 20 causes the relay contact 22 to assume its right-hand position, as shown, but when both windings are energized, contact 22 assumes its left-hand position. The armature of relay CF is biased magnetically only to an extent sufficient to cause its left-hand contact to close when both windings are deenergized. This adjustment provides a high degree of compensation for variations in supply voltage since the operating and biasing forces both vary in the same sense and in the same proportion.

A code following relay CF which is biased magnetically to its right-hand position with a force corresponding to that provided by the energization of winding 20 may also be used, in which case winding 20 is not needed, but the electrically biased relay is preferred because it may be more readily adjusted to any desired degree of sensitivity, and for the further reason that it provides voltage compensation, as previously described.

From the circuit elements and connections thus far described, it will be apparent that the code transmitter 75CT periodically establishes a high resistance connection from the positive side of the battery to ground. The code following relay CF having its main coil 19 connected across the negative wire N and ground, will follow the code and operate its contact 22 to the left each time contact 14 closes, and to the right each time contact 14 opens. The apparatus operates on the closed circuit principle, so that any opening of the circuit will stop the code operation of relay CF with its contact in either its right-hand or left-hand position, and lamp 10 or 11 will be energized in the manner to be described to indicate the inoperative condition of the circuit.

The ground detector is further provided with a code detecting relay CD having its winding connected at one end to the negative wire N and connected at the other end through a resistor 23 and a reset button ST to the positive wire B. Relay CD is made slow to release by the provision of a snubbing condenser 24 connected in parallel with its winding.

Relay CD is picked up by pressing button ST at a time when relay CF is being operated periodically, and is then maintained picked up by energy stored in a condenser 25 and supplied periodically to relay CD by relay CF. Assuming that relay CD is picked up, it will be seen that each time relay CF is operated to the left, condenser 25 is charged over the circuit extending from the positive wire B, over front contact 13 of code transmitter 75CT, over front contact 26 of relay CD, the left-hand contact 22 of relay CF and front contact 27 of relay CD through resistor 28 and condenser 25 to wire N. Each time relay CF is operated to the right, the energy stored in condenser 25 discharges in part over the circuit including resistor 28, front contact 27 of relay CD, right-hand contact 22 of relay CF, front contact 29 and winding of relay CD. A portion of this energy is stored in condenser 24, which discharges through the winding of relay CD and serves to maintain it picked up during the intervals when contact 22 is in its left-hand position.

When relay CD is picked up, the green lamp 12 is energized over a circuit extending from one terminal BX of a suitable source of energy, usually the local alternating current lighting circuit, over the disconnect switch contact 30, front contact 31 of relay CD, lamp 12 to the other terminal NX of the same source.

When relay CD is released, the red lamp 10 or 11 is energized over the circuit from terminal BX, contact 30 of the disconnect switch, back contact 27 of the relay CD, contact 22 of relay CF, back contact 29 or 26 of relay CD and lamp 10 or 11 to terminal NX.

In addition to the foregoing, the ground detector system includes a fixed calibrating resistor 33 through which the wires B and N may be grounded by the operation of the manually operable keys T1 and T2 for purposes of test or adjustment, as hereinatfer described.

When the ground detector is connected to the source 7 over line wires B and N, the code transmitter 75CT operates continuously and its contact 14 periodically applies a high resistance ground to line wire B. In the absence of ground on either line wire due to a fault, the code following relay CF having its winding 19 connected between ground and the negative line N repeats the code operation of contact 14, and if relay CD is released, the periodic operation of contact 22 causes the red lamps 10 and 11 to flash alternately and equally at the code rate. Relay CD is picked up by momentarily pressing the button ST, and is maintained picked up, as long as the periodic operation of contact 22 continues, by energy stored in condenser 25 each time contact 22 assumes its left-hand position and delivered to relay CD each time contact 22 assumes its right-hand position.

When relay CD is picked up, red lamps 10 and 11 are dark and the green lamp 12 is steadily lighted, indicating that the ground detector is in operation and that the line wires to which it is connected are substantially free from grounds.

If the positive line wire B becomes grounded for any reason, contact 14 will be shunted by the ground connection and energy from wire B will be supplied continuously to winding 19, causing relay CF to hold its contact 22 in the left-hand position, and relay CD will release as soon as the energy stored in condenser 24 discharges through its winding, and will open its holding circuit at contact 29. Lamp 12 will become dark and lamp 11 will be steadily lightly to provide a visual indication of the grounded condition of the positive line wire B.

If the negative line wire N becomes grounded for any reason, instead of wire B, when the ground detector system is in operation as above described, the winding 19 of the code following relay CF will be shunted by the connection from wire N to ground, enabling the winding 20 to hold contact 22 in its right-hand position, and relay CD will release as soon as the energy stored in condensers 25 and 24 discharges through its winding, opening its holding circuit at contact 29. Lamp 12 will become dark and lamp 10 will be steadily lighted to provide a visual indication of the grounded condition of the negative line wire N.

The disconnect switch DS is provided to permit the opening of the coding circuit, the code following relay circuit and the signal lamp circuits so that these circuits will not interfere with the work of locating the grounds detected by the system. Should the grounded condition of either line wire B or N be cleared while the disconnect switch contacts are closed, relay CF will resume its code operation, alternately completing the circuits for lamps 11 and 12. The two red lamps will thus flash alternately and equally until the reset button ST is pressed to reenergize the code detector relay CD.

If the wire 240B should become grounded for any reason, the periods in which the contact 9 of code transmitter 240CT connects the wire 240B to wire B will produce the same effect on the ground detector apparatus as a ground on the wire B which is connected and disconnected 240 times per minute. Accordingly, the relay CF will operate its contact at the 240 code rate, except during the time that contact 14 of code transmitter 75CT is closed to ground wire B. Thus relay CF will operate on a "mixed" code of 75 and 240 impulses per minute.

When the contacts of code transmitter 75CT are picked up, contact 22 of relay CF is operated to its left-hand position as the result of line wire B being grounded through front contact 14 of code transmitter 75CT. Energy is supplied to the capacitor 25 at this time over the circuit including front contact 13 of code transmitter 75CT and left-hand contact 22 of relay CF. When the contacts of code transmitter 75CT are released, energy is supplied to the code detecting relay CD from the condenser 25 if contact 22 of relay CF is in its right-hand position, but since the relay is being operated due to the ground on the 240B wire, the first time that contact 22 of relay CF moves to its left-hand position, a circuit is established for supplying energy from condenser 25 to the winding 19 of relay CF. This circuit may be traced from condenser 25, through resistor 28, over contact 27 of relay CD, over left-hand contact 22 of relay CF, over front contact 26 of relay CD, over back contact 13 of code transmitter 75CT, through resistor 16, contact 15 of disconnect switch DS, ground, contact 17 of the disconnect switch, resistor 18, winding 19 of relay CF to negative wire N and condenser 25. Accordingly, the relay CF will have its contact 22 held in its left-hand position until the contact 13 of code transmitter 75CT picks up. Subsequent operations will occur in the same manner, so that contact 22 of relay CF will occupy its left-hand position for a much longer time than its right-hand position. As a result, only a small amount of energy is supplied from condenser 25 to the winding of relay CD and to snubbing condenser 24. The parts are proportioned and arranged so that the value of energy supplied to the winding of relay CD under these conditions is insufficient to keep the contacts of the relay picked up, and its contacts will therefore release, opening the stick circuit at front contact 29 of relay CD, so that relay CD will remain released at this time.

When the contacts of relay CD release, the green lamp 12 is extinguished and the red lamps 10 and 11 are flashed irregularly in response to the combined effect of the ground on the 240B wire and the grounding circuit governed by contact 14 of code transmitter 75CT. This irregular flashing indicates the presence of a ground on the coded energy wire 240B.

As in the case of a ground on wire B or N, the disconnect switch DS may be opened to facilitate the location and repair of the grounding fault. When the grounded condition is cleared, and the disconnect switch is closed, the red lamps 10 and 11 will flash equally at the 75 code rate until the reset button is pressed to pick up relay CD.

To calibrate the ground detector, it is connected to the terminal wires such as B and N of a supply circuit known to be free from grounds and the keys T1 and T2 are closed, one at a time.

When key T1 is closed, winding 19 of relay CF is supplied with energy over a circuit from wire B, key T1, through resistor 33 to ground in parallel with the intermittently closed circuit including resistor 16 and contact 14. Resistors 18 and 21 are adjusted so that relay CF just fails to open its left-hand contact in response to the opening of contact 14. The value of resistor 33 then represents the maximum resistance of a connection of wire B to ground, due to a fault, which the system is capable of detecting.

Key T1 is then opened and key T2 closed, so that a portion of the energy supplied from wire B over contact 14 is shunted from winding 19 through resistor 33 to wire N. Resistor 16 is adjusted so that relay CF just fails to open its right-hand contact in response to the closing of contact 14. The value of resistor 33 then represents the maximum resistance of a connection of wire N to ground, due to a fault, which the system is capable of detecting.

In practice, the calibrating resistor may have a value of 5000 ohms, for example, well above the maximum resistance of any ground due to a fault which would have an adverse effect on the signaling apparatus connected to line wires B and N, and the ground detector system will then detect the occurrence of any ground the resistance of which is less than its calibrated value. If the ground is permanent, lamp 11 will be steadily lighted if it is on wire B, and lamp 10 will be lighted if it is on wire N. If the ground is temporary and of a duration of one-half second or more, for example, sufficient to effect the release of relay CD, lamps 11 and 12 will flash alternately at the code rate, following the removal of the temporary ground, until the system is reset by pressing button ST.

If the ground is one wire 240B, the lamps 10 and 11 will flash irregularly, and after the ground is removed, the lamps will flash equally until the system is reset by operation of reset button ST.

Referring now to Fig. 2 of the drawings, there is shown a modification of the ground detector system shown in Fig. 1. The difference between this arrangement and that shown in Fig. 1 lies in the use of a decoding transformer arrangement for detecting the recurrent and concurrent operation of the controlling coding device 75CT and the sensitive relay CF. The decoding transformer DT has a center tapped primary winding 39, the center tap of which is connected to wire N, and the end terminals of which are selectively connected to wire B according as contact 22 of relay CF is in its left-hand position or its right-hand position. The secondary winding 41 of transformer DT has a center tap which is connected to one terminal of the winding of code detecting relay CD. The end terminals of the secondary winding 41 are selectively connected to the other terminal of the winding of relay CD by a circuit including contact 35 of code transmitter 75CT in its released or its picked-up position, and through a pickup circuit including the contact of the reset button ST, or a stick circuit including front contact 29 of relay CD. When the contact 22 of relay CF is in its right-hand position, as shown, current flows downward in the upper half of the primary winding 39 of transformer DT, and when the contact 22 of relay CF is in its left-hand position, current flows upward in the lower half of the primary winding 39 of transformer DT. As a result, an alternating flux is set up in the core of the transformer which induces an alternating voltage in the secondary winding 41 of the transformer. This alternating voltage is mechanically rectified by the contact 35 of code transmitter 75CT in the following manner: Assuming that the contacts are occupying the position shown in the drawing, the initiation of the flow of current in the primary winding 39 can be considered as causing a voltage to be induced in the secondary winding such that the lower end of the winding is positive with respect to the center tap. At this time, therefore, current will flow from the lower end of the secondary winding, over back contact 35 of code transmitter 75CT, over front contact 29 of relay CD, and through the winding of relay CD to the center tap. When the contacts of code transmitter 75CT pick up, contact 14 applies a ground to wire B through resistor 16, and, as previously described in connection with Fig. 1, relay CF will operate its contacts to their left-hand position. The initiation of current flow in the lower half of the primary winding of transformer DT and the cessation of current flow in the upper half of the primary winding, due to the shift of contact 22 of relay CF to its left-hand position, causes a voltage to be induced in the secondary winding such that the upper end of the secondary winding is positive with respect to the center tap. At this time, since contact 35 of code transmitter 75CT is picked up, current will flow from the upper end of the secondary winding, over front contact 35 of code transmitter 75CT, over front contact 29 of relay CD, and through the winding of relay CD to the center tap of the secondary winding. Continual and synchronous operation of the contacts of code transmitter 75CT and relay CF cause a repetition of the operation described above. Accordingly, the relay CD is supplied with unidirectional pulses of energy, and the apparatus is proportioned and arranged so that the value of energy supplied to the winding of relay CD at this time is sufficient to pick up the contacts of relay CD. If the contacts 22 and 35 are not operating recurrently and in synchronism, the energy induced in the secondary winding of transformer DT will not be properly rectified, since the polarity of the winding and the position of contact 35 will not always be such that current will flow in the same direction through the winding of relay CD. In order to keep the relay CD picked up during the interval between the pulses of energy, the relay CD is arranged to be slightly slow in releasing, such as by the provision of one or more copper ferrules on the relay core structure, or by the provision of a snubbing condenser, such as shown in Fig. 1. The provision of the stick circuit including front contact 29 of relay CD in the control circuit of relay CD serves to maintain the relay CD released, when once released, until the reset push button is closed in the pickup circuit for relay CD.

From the foregoing, it will be apparent that relay CD will be picked up when and only when the contacts of code transmitter 75CT and relay CF are operating recurrently and concurrently. If either or both of the contacts stop operating, or if the contacts operate synchronously, the relay CD will release, and will not pick up again until the contacts are again operating recurrently and concurrently, and the reset button ST is operated.

The lamps 10, 11, and 12 are arranged to provide indications similar to those previously described in connection with Fig. 1, that is, when the system is in normal operation, green lamp 12 is lighted by energy supplied over a circuit including front contact 31 of relay CD. When relay CD is released, due to the occurrence of a ground, one of the red lamps 10 or 11 will be illuminated by energy supplied over a circuit including back contact 31 of relay CD and contact 37 of relay CF in one or the other of its two positions.

If the positive wire B becomes grounded for any reason, contact 14 will be shunted by the ground connection and energy from wire B will be supplied continuously to winding 19 of relay CF, causing relay CF to hold its contacts in their left-hand position. Accordingly, relay CD will be released, and the red lamp 11 will be steadily lighted and green lamp 12 will be dark, thereby indicating the presence of a ground on wire B.

If the negative wire N becomes grounded for any reason, the winding 19 of relay CF will be shunted by the connection from wire N to ground, so that the contacts of relay CF remain in their right-hand position, resulting in the release of relay CD. Lamp 10 will then be steadily lighted, and lamp 12 will be dark, thereby indicating the presence of a ground on wire N.

If the coded energy wire 240B becomes grounded for any reaon, the code following relay will be operated by a "mixed" code of 75 and 240 impulses per minute, as a result of the grounding of wire B 75 times per minute by code transmitter 75CT, and the grounding of wire B 240 times per minute as a result of the grounded wire 240B being connected to wire B at this rate by contact 9 of code transmitter 240CT. As a result, the contacts of relay CF and code transmitter 75CT will no longer be operating synchronously, and as previously explained, relay CD will release under these conditions. With relay CD released, and the contact 37 of relay CF operating on the "mixed" code, the lamp 12 will be dark, and the lamps 10 and 11 will be flashed irregularly, thereby indicating the presence of a ground on wire 240B.

The restoration of the ground detector system to normal after the ground has been cleared and the calibration of the system are similar to the operations described in connection with Fig. 1, and a detailed description of these operations is deemed unnecessary.

Although I have herein shown and described only two forms of ground detecting apparatus embodying my invention, it will be understood that various changes and modifications may be made therein within the scope of the appended claims without departing from the spirit and scope of my invention.

Having thus described my invention, what I claim is:

1. In combination, a coding device having a contact which is recurrently operated between a first and a second position, a code-following relay governed by said coding device and having a contact which is normally operated between a first and a second position in response to the operation of said coding device, and means for detecting the recurrent and concurrent operation of the contact of said coding device and the contact of said code-following relay, comprising a slow-release code detecting relay, and circuit means including said contacts recurrently synchronously closed in a corresponding one of their two positions for supplying impulses of energy to said slow-release code detecting relay.

2. In combination, a coding device having a contact which is recurrently operated between a first and a second position, a code-following relay governed by said coding device and having a contact which is normally operated between a first and a second position in response to the operation of said coding device, and means for detecting the recurrent and concurrent operation of the contacts of said coding device and the contact of said code following relay, comprising a slow-release code detecting relay, and circuit means including said contacts for supplying pulses of energy to the winding of said slow release relay when said contacts are recurrently and synchronously operating between their two positions.

3. In combination, a coding device having a contact which is recurrently operated between a first and a second position, a code-following relay governed by said coding device and having a contact which is normally operated between a first and a second position in resopnse to the operation of the contact of said coding device between its first and second position, and means for detecting the recurernt and concurrent operation of the contact of said coding device and the contact of said code-following relay, comprising a slow-release code detecting relay, a condenser, first circuit means for supplying energy to said condenser including the contact of said coding device and the contact of said code-following relay closed in one of their two positions, and second circuit means for supplying energy from said condenser to the winding of said slow-release code-detecting relay including the contact of said code-following relay closed in the other of its two positions.

4. In combination, a coding device having a contact which is recurrently operated between a first and a second position, a code-following relay governed by said coding device and having a contact which is normally operated between a first and a second position in response to the operation of the contact of said coding device between its first and second position, and means for detecting the recurrent and concurrent operation of the contact of said coding device and the contact of said code-following relay, comprising a slow-release code detecting relay, a condenser, first circuit means for supplying energy to said condenser including the contact of said coding device and the contact of said code-following relay closed in one of their two positions, second circuit means for supplying energy from said condenser to the winding of said slow release code detecting relay including the contact of said code-following relay closed in the other of its two positions, and third circuit means for supplying energy from said condenser to a winding of said code-following relay including the contact of said coding device closed in the other of its said two positions and the contact of said code following relay closed in the said one of its two positions.

5. In combination, a coding device having a contact which is recurrently operated between a first and a second position, a code-following relay governed by said coding device and having a contact which is normally operated between a first and a second position in response to the operation of the contact of said coding device between its first and second position, and means for detecting the recurrent and concurrent operation of the contact of said coding device and the contact of said code-following relay, comprising a slow-release code detecting relay, a condenser, first circuit means for supplying energy to said condenser including the contact of said coding device closed in its second position and the contact of said code-following relay closed in its second position to thereby charge the condenser to a value greater than a predetermined value, second circuit means for supplying energy from said condenser to the winding of said slow-release relay including the contact of said code-following relay closed in its first position, and circuit means including the contact of said code-following relay closed in its second position and the contact of said coding device closed in its first position for supplying energy to a winding of said code-following relay effective to maintain the contacts of said code-following relay closed in its second position until the energy stored in said condenser is dissipated to a predetermined value.

6. In combination, a coding device having a contact which is recurrently operated between a first and a second position, a code-following relay governed by said coding device and having a contact which is normally operated between a first and a second position in response to the operation of the contact of said coding device between its first and second position, and means for detecting the recurrent and concurrent operation of the contact of said coding device and the contact of said code-following relay, comprising a slow-release code detecting relay, a transformer having a first and a second winding, first circuit means including the contact of said code-following relay for recurrently supplying impulses of energy to the first winding of said transformer, whereby alternating current energy is induced in said second winding, second circuit means including the contact of said coding device for mechanically rectifying said alternating current energy induced in said second winding, and third circuit means for supplying the rectified energy to the winding of said slow-release relay.

7. In combination, a coding device having a contact which is recurrently operated between a first and a second position, a code-following relay governed by said coding device and having a contact which is normally operated between a first and a second position in response to the operation of the contact of said coding device between its first and second position, and means for detecting the recurrent and concurrent operation of the contact of said coding device and the contact of said code-following relay, comprising a slow-release code detecting relay, a transformer having a first and a second winding, first circuit means including the contact of said code-following relay for recurrently supplying impulses of energy to the first winding of said transformer, said impulses being of one polarity or the other according as the contact of said code-following relay is in its one position or the other, whereby said impulses induce alternating current energy in said second winding of the transformer, and second circuit means for rectifying said alternating current energy and supplying said rectified energy to the winding of said slow-release relay, including the contact of said coding device, the parts being proportioned and arranged so that energy of a value sufficient to properly energize said slow-release relay is supplied thereto when and only when the contacts of said coding device and said code-following relay are recurrently operating in synchronism.

8. In combination, a coding device having a contact which is recurrently operated between a first and a second position, a code-following relay governed by said coding device and having a contact which is normally operated between a first and a second position in response to the operation of the contact of said coding device between its first and second position, and means for detecting the recurrent and concurrent operation of the contact of said coding device and the contact of said code-following relay, comprising a slow-release code detecting relay, a source of direct current energy, a transformer having a center-tapped primary winding divided into a first and a second half and a center tapped secondary winding divided into a first and a second half; first circuit means for supplying impulses of energy from said source alternately to the first and the second half of said primary winding, comprising a first circuit including said source of energy, said first half of said primary winding, and the contact of said code-following relay closed in its first position and a second circuit including said source of energy, said second half of said primary winding, and the contact of said code-following relay closed in its second position; second circuit means for supplying energy from the secondary winding of said transformer to the winding of said slow-release relay, comprising a third circuit including the first half of said secondary winding, the contact of said coding device closed in its first position, and the winding of said slow-release relay and a fourth circuit including the second half of said secondary winding, the contact of said coding device closed in its second position, and the winding of said slow-release relay, the windings of said transformer being proportioned and arranged so that impulses of unidirectional energy of a value sufficient to energize said slow-release relay are supplied to the winding of said slow-release relay over said third and fourth circuits when and only when the contacts of said coding device and said code-following relay are operating recurrently and in synchronism.

9. A ground detector for a pair of energized line wires comprising a code-following relay, a code transmitter, means governed by said code transmitter for causing said code-following relay to be energized recurrently from energy supplied from said line wires when the wires are substantially free from grounds, a code detecting relay controlled by said code-following relay and said code transmitter, indication means controlled by said code detecting relay to indicate the grounded conditions of said wires due to a fault, means controlled by said code detecting relay for operating said indication means to indicate the ungrounded condition of said line wires when said code-following relay is recurrently energized by said code transmitter and in synchronism with said code transmitter, means causing said code-following relay to remain energized when one of said line wires is grounded and to remain de-energized when the other of said line wires is grounded, and means controlled by said code detecting relay for operating said indication means to indicate which of said line wires is grounded due to such fault.

10. A ground detector for a direct current supply circuit including two line wires, comprising a code transmitter for generating code impulses of energy derived from said line circuit, a code-following relay, a grounded circuit for supplying the impulses to said relay, so arranged that the relay remains energized when one of said line wires is grounded due to a fault and remains de-energized when the other of said line wires is grounded due to a fault, a code detecting relay controlled by said code-following relay and said code transmitter, and indication means controlled by said code detecting relay to indicate the ungrounded condition of said line wires when said code-following relay is responding synchronously to said code impulses and to indicate which of said line wires is grounded due to a fault when the operation of the code-following relay ceases to operate in synchronism with said code transmitter due to said fault.

11. A ground detector for a direct current supply circuit including two line wires, comprising a code transmitter for periodically connecting one of said line wires to ground through a first resistor, a code-following relay connected to the other of said line wires and ground through a second resistor, a contact on said relay adapted to synchronously follow the code of said transmitter, said contact remaining in one position when one of said line wires is grounded due to a fault having a resistance less than a predetermined value and remaining in another position when the other of said line wires is grounded due to a fault having a resistance less than a predetermined value, a code detecting relay energized by the synchronous operation of said code-following relay and said code transmitter, indication means controlled by said code detecting relay to indicate the ungrounded condition of said line wires, and means for adjusting said resistors for determining the maximum value of fault resistance to be indicated by said code detecting relay.

12. A ground detector for a direct current supply circuit including two line wires, comprising a code transmitter relay having a contact which closes periodically and a code-following relay, a circuit for said relay extending from one of said line wires over said contact to ground and from the other of said line wires through the winding of said relay to ground, whereby a ground due to a fault on said one line wire shunts said contact and a ground due to a fault on the other line wire shunts the winding of said relay, said relay being supplied periodically with energy from said supply circuit only when both line wires are substantially free from grounds, a code detecting relay having a pickup circuit and a stick circuit, manually operable means for closing said pickup circuit to initially energize the code detecting relay, decoding means for supplying impulses of energy to said stick circuit in response to the periodic and synchronous operation of said code-following relay and said code transmitter to maintain said code detecting relay energized, and indication means controlled by said code detecting relay.

13. A ground detector for a pair of line wires comprising a code-following relay, means including a code transmitter for periodically operating the contacts of said relay between two positions effective only when said line wires are substantially free from grounds, a code detecting relay selectively responsive to the periodic and synchronous operation of said code-following relay and said code transmitter, a plurality of indication lamps, first circuit means including a contact of said code detecting relay for energizing a first indication lamp, second circuit means including a contact of said code detecting relay and a contact of said code following relay closed in one of its two positions for energizing a second indication lamp, and third circuit means including a contact of said code detecting relay and a contact of said code following relay closed in the other one of its two positions for energizing a third indication lamp, whereby said first lamp is steadily lighted to indicate that the line wires are substantially free from grounds said second lamp is steadily lighted to indicate that one of said wires is steadily grounded due to a fault, said third lamp is steadily lighted to indicate that the other of said wires is steadily grounded due to a fault, said second and said third lamps are intermittently lighted and said first lamp is extinguished to indicate a recurrent ground on one of said wires, and said second and said third lamp are alternately lighted and said first lamp is extinguished to thereby indicate the removal of a temporary ground on one or the other of said wires.

ARTHUR E. DODD.

REFERENCES CITED

The following references are of record in the file of this patent:

UNITED STATES PATENTS

| Number | Name | Date |
| --- | --- | --- |
| 2,010,840 | Baughman | Aug. 13, 1935 |

OTHER REFERENCES

"Publication," Railway Signaling, October 1947, p. 639.